US005527748A

United States Patent [19]
Zank

[11] Patent Number: 5,527,748
[45] Date of Patent: Jun. 18, 1996

[54] HIGH DENSITY ZIRCONIUM DIBORIDE CERAMICS PREPARED WITH PRECERAMIC POLYMER BINDERS

[75] Inventor: Gregg A. Zank, Midland, Mich.

[73] Assignee: Dow Corning Corporation, Midland, Mich.

[21] Appl. No.: 386,784

[22] Filed: Feb. 10, 1995

Related U.S. Application Data

[62] Division of Ser. No. 282,300, Jul. 29, 1994, Pat. No. 5,449,646.

[51] Int. Cl.⁶ .......................... C04B 35/58; C04B 35/571
[52] U.S. Cl. ................................. 501/92; 501/96
[58] Field of Search ................................. 501/92, 91, 94, 501/96

[56] References Cited

U.S. PATENT DOCUMENTS

| | | | |
|---|---|---|---|
| 3,775,137 | 11/1973 | Clougherty et al. | 501/92 |
| 4,289,720 | 9/1981 | Yajima et al. | |
| 4,636,481 | 1/1987 | Kida et al. | 501/92 X |
| 4,668,643 | 5/1987 | Kida et al. | 501/92 |
| 4,678,759 | 7/1987 | Kida et al. | 501/92 |
| 4,933,308 | 6/1990 | Nishio et al. | 501/92 |

*Primary Examiner*—Karl Group
*Attorney, Agent, or Firm*—Roger E. Gobrogge

[57] ABSTRACT

Disclosed is a method for preparing high density zirconium diboride ceramic bodies. The method entails mixing zirconium diboride powder with a preceramic organosilicon polymer. The mixture is then molded and sintered under pressure or by a pressureless process.

1 Claim, No Drawings

HIGH DENSITY ZIRCONIUM DIBORIDE CERAMICS PREPARED WITH PRECERAMIC POLYMER BINDERS

This is a divisional of application Ser. No. 08/282,300 filed on Jul. 29, 1994 now U.S. Pat. No. 5,449,646.

BACKGROUND OF THE INVENTION

This invention relates to the preparation of high density zirconium diboride ceramic bodies by the pyrolysis of mixtures comprising zirconium diboride powder and preceramic organosilicon polymers.

Zirconium diboride ceramic bodies are known in the art. They have found particular utility, for example, as wear parts and in the nuclear industry because of their high hardness, resistance to wear and nuclear properties. Early methods for producing these bodies involved hot-pressing zirconium diboride powder at temperatures up to 2300° C. This method, however, has a number of disadvantages. In the first place, the method does not produce green bodies and, as such, does not allow for green machining. Secondly, the process is expensive in that it requires the use of high pressure during sintering. Finally, it is difficult to form bodies of complex size and shape by hot pressing methods.

An alternative approach to producing zirconium diboride bodies is to use fugitive binders to form green zirconium diboride bodies and then pressureless sintering these green bodies. In this approach, however, the binder must be pyrolyzed out of the bodies. As such, the process takes additional time and the ceramic bodies undergo significant shrinkage which may result in warpage or cracks.

Yajima et al. in U.S. Pat. No. 4,289,720 teach a process for the formation of ceramic fired bodies. The process comprises molding mixtures of organosilicon polymers and ceramic powders to form green bodies followed by pyrolyzing the green bodies to form ceramic bodies. The reference, however, lists over 150 ceramic powders (including zirconium diboride) whereas the examples only show densification of silicon carbide, silicon nitride and boron carbide. Moreover, the reference only teaches temperatures up to 2000° C. (temperatures in the range of 1550°–1800° C. are preferred) (col. 9, lines 1–4). The present Applicant has discovered that such temperatures are not sufficient to complete the polymer pyrolysis. As such, the density of the bodies in the reference is less than those of the present application.

The object of the present invention is to provide a method for producing high density, high strength zirconium diboride ceramic bodies. The present inventor has unexpectedly discovered that such ceramics can be obtained by sintering a mixture comprising a preceramic organosilicon polymer and zirconium diboride powder.

SUMMARY OF THE INVENTION

The present invention relates to a method for preparing a sintered zirconium diboride ceramic body. The method comprises blending zirconium diboride powder and a preceramic organosilicon polymer to a uniform mixture. The preceramic organosilicon polymer is one which provides at least a stoichiometric amount of carbon based on the silicon content. The uniform mixture is then formed into the desired shape to obtain a handleable green body. The handleable green body is then sintered in an inert atmosphere at a temperature greater than 2000° C. to obtain a sintered body with a density greater than about 5.3 g/cm$^3$.

DETAILED DESCRIPTION OF THE INVENTION

The present invention relates to the preparation of high density sintered zirconium diboride bodies from preceramic organosilicon polymers and zirconium diboride powder. The sintered bodies produced by the practice of this invention have densities greater than about 5.3 g/cm$^3$. Such highly densified bodies are useful, for example, in wear parts and the nuclear industry.

As used in the present application, the theoretical density of zirconium diboride is 6.08 g/cm$^3$. As discussed infra, however, the ceramic bodies of the present invention generally contain some SiC and B$_4$C in the intergranular pores. The theoretical amount of SiC and B$_4$C in a ceramic body is taken into consideration when calculating theoretical densities.

The first step of the present invention comprises blending the organosilicon polymer with the zirconium diboride powder. The organosilicon polymers useful in this invention are generally well known in the art. Organosilicon polymers with a significant ceramic char yield are preferred because the amount of binder shrinkage that occurs upon pyrolysis decreases as the char yield increases. Preferably, therefore, the ceramic char yield is greater than about 20 weight percent. More preferably, organosilicon polymers with ceramic char yields greater than about 35 weight percent are employed. Most preferably, organosilicon polymers with ceramic char yields greater than about 45 weight percent are employed.

The organosilicon polymer must also yield a ceramic char containing at least enough carbon to form silicon carbide with the silicon present in the char (hereafter referred to as a "stoichiometric amount"). Excess carbon in the char is often preferred because it assists in removing oxygen and thus, in the densification of the ceramic body. This excess carbon is referred to as "free carbon" (i.e., excess carbon present in the char over the amount of carbon needed to form silicon carbide with the silicon present in the char). It is often preferred that the ceramic char contain at least 10 weight percent free carbon. It is often more preferred that the ceramic char contain at least 25 weight percent free carbon.

Organosilicon polymers within the scope of this invention include polysiloxanes, polysilazanes, polysilanes, and polycarbosilanes. If the organosilicon polymer is an organopolysiloxane, it may contain units of general structure [R$_3$SiO$_{0.5}$], [R$_2$SiO], [RSiO$_{1.5}$], and [SiO$_2$] where each R is independently selected from the group consisting of hydrogen, alkyl radicals containing 1 to 20 carbon atoms such as methyl, ethyl, propyl etc., aryl radicals such as phenyl, and unsaturated alkyl radicals such as vinyl. Examples of specific organopolysiloxane groups include [PhSiO$_{1.5}$], [MeSiO$_{1.5}$], [MePhSiO], [Ph$_2$SiO], [PhViSiO] [ViSiO$_{1.5}$], [MeHSiO], [MeViSiO], [Me$_2$SiO], [Me$_3$SiO$_{0.5}$], and the like. Mixtures of organopolysiloxanes may also be employed.

The organopolysiloxanes of this invention can be prepared by techniques well known in the art. The actual method used to prepare the organopolysiloxanes is not critical. Most commonly, the organopolysiloxanes are prepared by the hydrolysis of organochlorosilanes. Such methods, as well as others, are described in Noll, *Chemistry and Technology of Silicones,* chapter 5 (translated 2d Ger. Ed., Academic Press, 1968).

The organopolysiloxane may also be substituted with various metallo groups (i.e., containing repeating metal-O-Si units). Examples of suitable compounds include borosiloxanes and alumosiloxanes which are both well known in the art. For instance, Noll, *Chemistry and Technology of Silicones*, chapter 7, (translated 2d Ger. Ed., Academic Press, 1968) describes numerous polymers of this type as well as their method of manufacture. Additionally, Japanese Kokai Patent No. Sho 54[1979]-134744 granted to Tamamizu et al., U.S. Pat. No. 4,455,414 granted to Yajima et al. and U.S. Pat. No. 5,112,779 granted to Burns et al. also describe the preparation and utility of various polymetallosiloxanes as binders for SiC powder. All of these references are hereby incorporated by reference.

If the preceramic organosilicon polymer is a polysilazane, it may contain units of the type [$R_2SiNH$], [$RSi(NH)_{1.5}$], and/or

where each R is independently selected from the group consisting of hydrogen, alkyl radicals containing 1 to 20 carbon atoms such as methyl, ethyl, propyl etc., aryl radicals such as phenyl, and unsaturated hydrocarbon radicals such as vinyl and each R', R", and R'" is independently selected from the group consisting of hydrogen, alkyl radicals having 1 to 4 carbon atoms, aryl radicals such as phenyl, and unsaturated hydrocarbon radicals such as vinyl. Examples of specific polysilazane units include [$Ph_2SiNH$], [$PhSi(NH_{1.5})$],

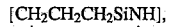

[$MeSi(NH)_{1.5}$], [$Me_2SiNH$], [$ViSi(NH)_{1.5}$], [$Vi_2SiNH$], [$PhMeSiNH$], [$HSi(NH)_{1.5}$], [$PhViSiNH$], [$MeViSiNH$], and the like.

The polysilazanes of this invention can be prepared by techniques well known in the art. The actual method used to prepare the polysilazane is not critical. Suitable preceramic silazane polymers or polysilazanes may be prepared by the methods of Gaul in U.S. Pat. Nos. 4,312,970 (issued Jan. 26, 1982), 4,340,619 (issued Jul. 20, 1982), 4,395,460 (issued Jul. 26, 1983), and 4,404,153 (issued Sep. 13, 1983), all of which are hereby incorporated by reference. Suitable polysilazanes also include those prepared by the methods of Haluska in U.S. Pat. No. 4,482,689 (issued Nov. 13, 1984) and Seyferth et al. in U.S. Pat. No. 4,397,828 (issued Aug. 9, 1983), both of which are hereby incorporated by reference. Other polysilazanes suitable for use in this invention can be prepared by the methods of Cannady in U.S. Pat. Nos. 4,540,803 (issued Sep. 10, 1985), 4,543,344 (issued Sep. 24, 1985), Burns et al. in J. Mater. Sci, 22 (1987), pp 2609–2614, and Burns in U.S. Pat. Nos. 4,835,238, 4,774,312, 4,929,742 and 4,916,200, which are all incorporated herein in their entirety.

The polysilazane may also be substituted with various metal groups (i.e., containing repeating metal-N-Si units). Examples of suitable compounds include borosilazanes which are known in the art. These include, but are not limited to, those described in U.S. Pat. No. 4,910,173 granted to Niebylski, those described by Haluska in U.S. Pat. No. 4,482,689, those described by Zank in U.S. Pat. Nos. 5,164,344, 5,252,684 and 5,169,908, those described by Funayama et al., in U.S. Pat. No. 5,030,744, those described by Seyferth et al., J. Am. Ceram. Soc. 73, 2131–2133 (1990), those described by Noth, B. Anorg. Chem. Org. Chem., 16(9), 618–21, (1961), and those described by Araud et al. in European Patent No. 364,323, which are all incorporated herein by reference in their entirety.

If the preceramic organosilicon polymer is a polysilane, it may contain units of general structure [$R_3Si$], [$R_2Si$], and [$RSi$] where each R is independently selected from the group consisting of hydrogen, alkyl radicals containing 1 to 20 carbon atoms such as methyl, ethyl, propyl etc., aryl radicals such as phenyl, and unsaturated hydrocarbon radicals such as vinyl. Examples of specific polysilane units are [$Me_2Si$], [$PhMeSi$], [$MeSi$], [$PhSi$], [$ViSi$], [$PhMeSi$], [$MeHSi$], [$MeViSi$], [$Ph_2Si$], [$Me_2Si$], [$Me_3Si$], and the like.

The polysilanes of this invention can be prepared by techniques well known in the art. The actual method used to prepare the polysilanes is not critical. Suitable polysilanes may be prepared by the reaction of organohalosilanes with alkali metals as described in Noll, *Chemistry and Technology of Silicones*, 347–49 (translated 2d Ger. Ed., Academic Press, 1968). More specifically, suitable polysilanes may be prepared by the sodium metal reduction of organo-substituted chlorosilanes as described by West in U.S. Pat. No. 4,260,780 and West et al. in 25 *Polym. Preprints* 4 (1984), both of which are incorporated by reference. Other suitable polysilanes can be prepared by the general procedures described in Baney, et al., U.S. patent application Ser. No. 4,298,559 which is incorporated by reference.

The polysilane may also be substituted with various metal groups (i.e., containing repeating metal-Si units). Examples of suitable metals to be included therein include boron, aluminum, chromium and titanium. The method used to prepare said polymetallosilanes is not critical. It may be, for example, the method of Chandra et al. in U.S. Pat. No. 4,762,895 or Burns et al. in U.S. Pat. No. 4,906,710, both of which are incorporated by reference.

If the preceramic organosilicon polymer is a polycarbosilane, it may contain units of the type [$R_2SiC$], [$RSiC_{1.5}$], and/or [$R_3SiC$] where each R is independently selected from the group consisting of hydrogen, alkyl radicals containing 1 to 20 carbon atoms such as methyl, ethyl, propyl etc., aryl radicals such as phenyl, and unsaturated hydrocarbon radicals such as vinyl. Suitable polymers are described, for instance, by Yajima et al. in U.S. Pat. Nos. 4,052,430 and 4,100,233, both of which are incorporated herein in their entirety. Polycarbosilanes containing repeating (—SiHCH₃—CH₂—) units can be purchased commercially from the Nippon Carbon Co.

The polycarbosilane may also be substituted with various metal groups such as boron, aluminum, chromium and titanium. The method used to prepare such polymers is not critical. It may be, for example, the method of Yajima et al. in U.S. Pat. Nos. 4,248,814, 4,283,376 and 4,220,600.

The above organosilicon polymers which contain vinyl groups may be preferred since vinyl groups attached to silicon provide a mechanism whereby the organosilicon polymer can be cured prior to sintering. Also, mixtures of any of the above organosilicon compounds are also contemplated by this invention.

Specific methods for preparation of suitable organosilicon polymers are illustrated in the examples included in the present specification.

The use of organosilicon polymers as binders for zirconium diboride powder is particularly advantageous over binders of the prior art since a polymer can be chosen which will provide a suitable char yield and, if desired, additional free carbon. In this manner, the polymer can be tailored to obtain a polymer/zirconium diboride ratio in the preceramic mixture which is suitable for the molding application utilized The preceramic organosilicon polymer is generally present in the compositions of the present invention in the range of about 1 wt % up to about 50 wt %. Preferably, the polymer is present in the range of about 5 wt % up to about 30 wt % and most preferably in the range of about 5 to 25 wt. %. The exact amount of polymer, however, is dependent on the method of molding used. For instance, for standard cold isostatic pressing the preferred amount of polymer is in the range of about 5–20 wt. %. On the other hand, for extrusion the preferred amount of polymer is in the range of about 15–25 wt. %.

The compositions of the invention also include zirconium diboride powders. These powders are commercially available and well known in the art from, for instance, Starck. Generally, zirconium diboride powders with an average particle size of less than 10 microns are preferred; powders with a number average particle size of less than 5 micron are more preferred; and those with a number average particle size less than 1 micron are most preferred.

The compositions of this invention may also contain curing agents which are used to cause the organosilicon polymer to crosslink prior to sintering. The green bodies produced thereby generally have higher strengths than the uncured articles and, thus, can better withstand any handling or machining processes prior to sintering. These curing agents are generally activated by heating the green body containing the curing agent to temperatures in the range of 50°–500° C.

Conventional curing agents which are useful in the present invention are well known in the art. Examples include organic peroxides such as dibenzoyl peroxide, bis-p-chlorobenzol peroxide, bis-2,4-dichlorobenzol peroxide, di-t-butyl peroxide, dicumyl peroxide, t-butyl perbenzoate, 2,5-bis(t-butylperoxy)-2,3-dimethylhexane and t-butyl peracetate; and platinum-containing curing agents such as platinum metal, $H_2PtCl_6$, and $((C_4H_9)_3P)_2PtCl_2$. Other conventional curing agents known in the art may also be used. The curing agent is present in an effective amount, i.e. an amount sufficient to induce crosslinking in the polymer. Therefore, the actual amount of the curing agent will depend on the activity of the actual agent used and the amount of polymer present. Normally, however, the peroxide curing agent will be present at about 0.1 to 5.0 weight percent based on the weight of the compound to be cured with the preferred amount being about 2.0 weight percent. When platinum-containing curing agents are used, the amount will normally be such that platinum is present at about 1 to 1000 ppm based on the weight of the compound to be cured with the preferred amount being about 50 to 150 ppm platinum.

In addition to the above curing agent, a crosslinking agent may also be included in the mixture to crosslink the polymer and, thereby, modify the cure characteristics. These agents can include, for example, polyfunctional silanes or siloxanes. The preferred crosslinking agents are siloxanes with Si—H functional bonds such as $Ph_2Si(OSiMe_2H)_2$ or $PhSi(OSiMe_2H)_3$.

The addition of other processing aids such as lubricants, deflocculants and dispersants is also within the scope of this invention. Examples of such compounds include stearic acid, mineral oil, paraffin, calcium stearate, aluminum stearate, succinic acid, succinimide, succinic anhydride or various commercial products such as Oloa 1200™.

Once the amounts of the various components have been determined, they are combined in a manner which assures a uniform and intimate mixture so that areas of varying density throughout the sintered product are avoided. Uniform and intimate mixtures can be prepared by using conventional blending techniques such as grinding the various powders in either the dry or wet state or ultrasonic dispersion. Other mixing and grinding methods will be apparent to those skilled in the art.

The above mixture is then formed into a handleable green body. "Handleable green body" as used herein means green bodies which have sufficient green strength to be handled or machined to a desired shape prior to sintering. Generally, green strengths of 20 $kg/cm^2$ or more may be obtained in the practice of this invention. This green strength is achieved primarily because the preceramic mixture includes an organosilicon polymer which acts as a matrix for the zirconium diboride powder. The increased green strength obtained by the practice of this invention alleviates the problems associated with handling fragile objects and allows for the production of more complex shapes through machining, milling etc.

The handleable green bodies may be formed by conventional techniques known in the art. Such methods include hot pressing, dry pressing, slip casting, pressure molding, uniaxial pressing, iso-pressing, extrusion, transfer molding, injection molding, and the like. The present invention is particularly advantageous in this respect since the amount of polymer in the preceramic mixture can easily be changed to accommodate the use of multiple molding techniques without affecting the quality of the sintered product.

The composition is preferably cured prior to its final shaping. Curing procedures are well known in the art. Generally, such curing can be carried out by heating the article to a temperature in the range of about 50° to 500° C., preferably in an inert atmosphere such as argon or nitrogen.

The shaped green bodies are then fired to an elevated temperature under an inert atmosphere to convert them into ceramic articles having densities greater than about 5.3 $g/cm^3$. Upon pyrolysis, the organosilicon polymers of this invention yield SiC and, optionally, free carbon. Additionally, the interaction of the polymer and the zirconium diboride powder generally yields boron carbide. These factors tend to decrease the amount of shrinkage that occurs when the mixture is sintered since the SiC and $B_4C$ forms in the intergranular pores of the zirconium diboride powder, thus limiting the shrinkage due to densification. Because less shrinkage occurs, sintered objects with increased tolerance control can be formed.

The compositions of this invention may be sintered either under pressure or by using a pressureless process to produce a highly densified ceramic article. Since the sintering process employing pressure will generally produce ceramic articles with higher density, such a method would be preferred if maximum density were desired. Generally, however, the pressureless sintering process is preferred because of the simplified operations involved.

Inert atmospheres are used for sintering to prevent oxygen incorporation and silica formation. The sintering process as well as the density of the sintered product are thereby enhanced. For purposes of this invention, an inert atmosphere is meant to include an inert gas, vacuum or both. If an inert gas is used it may be, for example, argon, helium or nitrogen. If a vacuum is used it may be, for example, in the range of 0.1–200 torr, preferably 0.1–0.3 torr. Exemplary of a combined process might be firing the composition in argon up to 1200° C., firing from 1200° to 1500° C. in a vacuum and firing from 1500° to 2150° C. under argon.

Sintering may be performed in any conventional high temperature furnace equipped with a means to control the furnace atmosphere. Temperatures of greater than 2000° C. are generally used with the preferred range being about 2100°–2250° C. The most preferred sintering temperature is about 2150° C. Though lower temperatures can be used, the ceramic product may not possess the desired density.

The temperature schedule for sintering depends on both the volume of parts to be fired and the composition of the mixture. For smaller objects the temperature may be elevated relatively rapidly. For larger objects or those with large concentrations of the organosilicon polymer, however, more extended programs are needed to create uniform ceramic bodies.

The resultant ceramic articles have densities greater than about 5.3 g/cm$^3$. It is preferred that the density of the ceramic article be greater than 5.4 g/cm$^3$. The bodies generally have strengths greater than 10 kg/m$^2$. Such bodies comprise a mixture of mainly zirconium diboride with small amount of boron carbide and silicon carbide being present (e.g., less than 10% of the total ceramic weight). Generally, the bodies contain about 2–10 wt % (e.g., 2–8 wt. %) silicon carbide, up to about 3 wt. % (e.g., 0.1–3 wt %) boron carbide, up to about 2 wt. % (e.g., 0.1–2 wt %) free carbon and 87–98 wt % zirconium diboride. The expression "zirconium diboride body" is used herein to describe these ceramic bodies.

So that those skilled in the art can better appreciate and understand the invention, the following examples are given. Unless otherwise indicated, all percentages are by weight. Throughout this specification "Me" represents a methyl group, "Ph" represents phenyl group, and "Vi" represents a vinyl group.

In the following examples, the analytical methods used were as follows:

Proton NMR spectra were recorded on either a Varian EM360 or FT 200 spectrometer and the results presented herein in ppm; fournier transform IR spectra were recorded on a Perkin Elmer 7700 FT spectrometer. Gel permeation chromatography (GPC) data were obtained on a Waters GPC equipped with a model 600E systems controller, a model 490UV and model 410 Differential Defractometer detectors; all values are relative to polystyrene. TGA and TMA data were recorded on a Du Pont 940 thermomechanical analyzer (TMA) and an Omnitherm thermal gravimetric analyzer (TGA) interfaced to an IBM 386 Computer.

Carbon, hydrogen and nitrogen analysis were done on a Control Equipment Corporation 240-XA Elemental Analyzer. Oxygen analysis was done on a Leco Oxygen Analyzer equipped with an Oxygen Determinator 316 (Model 783700) and an Electrode Furnace EF100. Silicon was determined by a fusion technique which consisted of converting the material to soluble forms of silicon and analyzing the solute for total silicon by atomic absorption spectrometry.

Fired densities were measured by water immersion techniques according to ASTM C373-72.

EXAMPLE 1

Pressureless sintering of zirconium diboride powder using Siloxane binder

A. Polymer Synthesis

A mixture of 3960 g of PhSi(OMe)$_3$ and 620 g (ViMe$_2$Si)$_2$O was added to a solution of 3 g of trifluoromethane sulfonic acid in 800 g of water. After approximately 20 minutes, the solution was refluxed for 5 hours. The solution was cooled and then neutralized with 2.73 g of potassium carbonate. The volatiles were removed by distillation until an internal temperature of 120° C. was reached. The reaction mixture was cooled and 1500 g of toluene and 125.7 g of a 3 wt % solution of KOH in water were added. The solution was refluxed and the water removed in a Dean-Stark trap. After all of the water was removed, the mixture was cooled and 20 mL of Me$_2$ViSiCl added. After stirring at room temperature for 2 hours, the mixture was filtered through a 0.2 micron membrane filter and the filtrate concentrated by rotary evaporation. The residue was dried for about 1–2 hours at 100° C. and less than 1 torr. The yield was 3053.3 g.

B. Polymer pyrolysis and Char Composition Calculations

A blend of 14.85 g of the resin formed in part A, 5.15 g of Ph$_2$Si(OSiMe$_2$H)$_2$ and 0.01 g Lupersol™ (bis (t-butyl peroxy-2,5-dimethylhexane) was prepared. An aliquot of the blend was crosslinked at 120° C. for one hour. An aliquot of the crosslinked polymer was weighed into a graphite crucible. The crucible was transferred into an Astro tube furnace. The furnace was evacuated to less than 20 torr and then backfilled with argon. This procedure was repeated twice. Under a purge of argon, the sample was heated to 1800° C. at 10° C./minute and held at temperature for 1 hour before cooling to room temperature. The sample had a mass retention of 44.9%. The elemental composition of the char was 53.4% carbon. The following calculation was made: 100 g of cured polymer gives 44.9 g of a ceramic char consisting of 20.9 g silicon (46.6 wt. % by difference) and 24 g carbon (53.4 wt. %). The char consists of 29.9 g of SiC (66.6%) and 15 g C (33.4%). Therefore, every g of polymer gives 0.299 g of SiC and 0.15 g of excess C.

C. Test Bar Fabrication and Firing

A mixture was prepared by mixing 9 g of the resin in section A dissolved in 200 mL toluene, 0.2 g Lupersol™, and 91 g of Starck zirconium diboride powder. The mixture was ultrasonicated for 5 minutes and transferred to a round bottom flask. The solvent was removed in vacuo and the residue further dried. The dried powder was ground in a mortar and pestle and then sieved through a 90 micron mesh sieve. The powder was dry pressed into test bars 35×8×2 mm in a WC lined die with a Carver laboratory press at 3220 kg/cm$^2$. The test bars were heated to 250° C. for 24 hours to crosslink the polymer. The test bars were fired to 1900°, 2100°, 2150°, or 2250° C. in argon using the following program: room temperature to 1200° C. at 5° C./minute, a 30 minute hold, 1200°–1400° C. at 5° C./minute under vacuum, and 1400° C. to final temp at 5° C./min with a 60 minute hold at temperature. The test bars are characterized in Table 1.

EXAMPLE 2

Pressureless sintering of zirconium diboride powder using a Siloxane binder

A. Polymer Synthesis

A mixture of 476 g of PhSi(OMe)$_3$, 286 g of MeSi(OMe)$_3$ and 137.5 g (ViMe$_2$Si)$_2$O was added to a solution of 4 g of trifluoromethane sulfonic acid in 400 g of water. After approximately 20 minutes, the solution was refluxed for 12 hours. The solution was cooled and then neutralized with 3.5 g of potassium carbonate. The volatiles were removed by distillation until an internal temperature of 110° C. was reached. The reaction mixture was cooled and 700 g of toluene and 70 g of a 3 wt % solution of KOH in water were added. The solution was refluxed and the water removed in a Dean-Stark trap. After all of the water was removed, the mixture was cooled and 27 mL of Me$_2$ViSiCl added. After stirring at room temperature for 2 hours, the mixture was filtered through a 0.2 micron membrane filter and the filtrate concentrated by rotary evaporation. The residue was dried for about 1–2 hours at 100° C. and less than 1 torr. The yield was 553.3 g.

B. Polymer pyrolysis and Char Composition Calculations

A blend of 6.554 g of the resin formed in part A and 0.06 g Lupersol™ was prepared. An aliquot of the blend was crosslinked at 180° C. for one hour. An aliquot of the crosslinked polymer was weighed into a graphite crucible. The crucible was transferred into an Astro tube furnace. The furnace was evacuated to less than 20 torr and then backfilled with argon. This procedure was repeated twice. Under a purge of argon, the sample was heated to 1800° C. at 10° C./minute and held at temperature for 1 hour before cooling to room temperature. The sample had a mass retention of 41.8%. The elemental composition of the char was 38.1% carbon and 61.9% silicon (by difference). The following calculation was made: 100 g of cured polymer gives 41.8 g of a ceramic char consisting of 25.9 g silicon and 15.9 g carbon. The char consists of 36.97 g of SiC (88.43%) and 4.83 g C (11.57%). Therefore, every g of polymer gives 0.369 g of SiC and 0.048 g of excess C.

C. Test Bar Fabrication and Firing

A mix was prepared using the following procedure: 9 g of the resin prepared in part A, 200 mL of toluene, and 0.20 g Lupersol™ was mixed with 91 g of Starck zirconium diboride powder in a beaker. The mixture was ultrasonicated, dried, ground, sieved, pressed, cured and fired as in Example 1 (except for not firing at 1900° C.). The test bars are characterized in Table 1.

EXAMPLE 3

Pressureless sintering of zirconium diboride powder using Polysilane binder

A. Polymer pyrolysis and Char Composition Calculations

A aliquot of commercially available PSS-400 obtained from Shinn Nisso Kaka Co., Ltd. was weighed into a graphite crucible. The crucible was transferred into an Astro tube furnace. The furnace was evacuated to less than 20 torr and then backfilled with argon. This procedure was repeated twice. Under a purge of argon, the sample was heated to 1800° C. at 10° C./minute and held at temperature for 1 hour before cooling to room temperature. The sample had a mass retention of 44.2%. The elemental composition of the char was 42.3% carbon and 57.7% silicon. The following calculation was made: 100 g of cured polymer gives 44.2 g of a ceramic char consisting of 25.5 g silicon and 18.7 g carbon. The char consists of 34.6 g of SiC (78.3%) and 9.58 g C (21.7%). Therefore, every g of polymer gives 0.346 g of SiC and 0.095 g of excess C.

B. Test Bar Fabrication and Firing

A mixture was prepared by mixing 9 g of the resin in section A, 200 mL of toluene and 91 g of Starck zirconium diboride powder. The mixture was ultrasonicated, dried, ground, sieved, pressed, crosslinked and fired as in Example 1. The test bars are characterized in Table 1.

EXAMPLE 4

Pressureless sintering of zirconium diboride powder using Polycarbosilane binder A. Polymer pyrolysis and Char Composition Calculations A aliquot of commercially available PCS obtained from Nippon Carbon Co., Ltd. was weighed into a graphite crucible. The crucible was transferred into an Astro tube furnace. The furnace was evacuated to less than 20 torr and then backfilled with argon. This procedure was repeated twice. Under a purge of argon, the sample was heated to 1800° C. at 10° C./minute and held at temperature for 1 hour before cooling to room temperature. The sample had a mass retention of 55.8%. The elemental composition of the char was 36.7% carbon and 63.3% silicon. The following calculation was made: 100 g of cured polymer gives 55.8 g of a ceramic char consisting of 63.3 wt % silicon and 37.2 wt % carbon. The Char consists of 49.9 g of SiC (84%) and 9.5 g C (16%). Therefore, every g of polymer gives 0.499 g of SiC and 0.090 g of excess C.

B. Test Bar Fabrication and Firing

A mixture was prepared by mixing 9 g of the resin in section A, 200 mL of toluene and 91 g of Starck Grade A zirconium diboride powder. The mixture was ultrasonicated, dried, ground, sieved, pressed, crosslinked and fired as in Example 1. The test bars are characterized in Table 1.

TABLE 1

| Ex No | Binder (wt %) | % SiC/ % C in Body | Cured Density (g/cm$^3$) | Firing Cond. (°C.) | Ceramic Density (g/cm$^3$) | 4 pt MOR (kg/m$^2$) |
|---|---|---|---|---|---|---|
| 1 | 9 | 3.24/0.94 | 3.86 | 1900 | 5.25 | |
| | | | | 2100 | 5.51 | 12.7 ± 0.8 |
| | | | | 2150 | 5.52 | 7.6 ± 0.2 |
| | | | | 2250 | 5.56 | 11.5 ± 3.8 |
| 2 | 9 | 3.83/0.19 | 4.04 | 2100 | 5.3 | 17.2 |
| | | | | 2150 | 5.52 | 7.4 |
| | | | | 2250 | 5.41 | 11.0 |
| 3 | 9 | 3.45/0.74 | 3.56 | 2100 | 5.42 | 13.9 ± 4.9 |
| | | | | 2150 | 5.54 | 9.9 ± 0.7 |
| | | | | 2250 | 5.55 | 9.2 ± 1.0 |
| 4 | 9 | 4.68/0.55 | 3.62 | 2100 | 5.41 | 12.8 ± 2.2 |
| | | | | 2150 | 5.40 | 11.8 ± 1.5 |
| | | | | 2250 | 5.48 | 11.7 ± 0.4 |

That which is claimed is:

1. A sintered zirconium diboride body consisting essentially of 2–10 wt % silicon carbide, 0.1 to 3 wt % boron carbide, 0.1 to 2 wt % free carbon and 85 to 97.8 wt % zirconium diboride, wherein the silicon carbide and free carbon are produced in situ from a preceramic organosilicon polymer and the boron carbide is produced in situ by the interaction of the preceramic organosilicon polymer and the zirconium diboride.

* * * * *